United States Patent
Beisheim et al.

(10) Patent No.: US 8,068,956 B2
(45) Date of Patent: Nov. 29, 2011

(54) RESTRAINING DEVICE FOR AN OCCUPANT OF A VEHICLE

(75) Inventors: Dirk Beisheim, Althengstett (DE); Werner Bernzen, Ehningen (DE); Xavier Christmann, Rueil Malmaison (FR); Dominic Reutter, Notzingen (DE); Juergen Schmitt, Koenigsbach-Stein (DE); Florian Zenker, Stuttgart (DE)

(73) Assignee: Daimler AG, Stuttgart (DE)

( * ) Notice: Subject to any disclaimer, the term of this patent is extended or adjusted under 35 U.S.C. 154(b) by 695 days.

(21) Appl. No.: 11/793,495

(22) PCT Filed: Dec. 23, 2004

(86) PCT No.: PCT/EP2004/014680
§ 371 (c)(1),
(2), (4) Date: Nov. 3, 2008

(87) PCT Pub. No.: WO2006/074675
PCT Pub. Date: Jul. 20, 2006

(65) Prior Publication Data
US 2009/0076685 A1    Mar. 19, 2009

(51) Int. Cl.
*B60R 22/00* (2006.01)
(52) U.S. Cl. ............ 701/45; 280/806; 180/268
(58) Field of Classification Search ............ 701/45; 280/806; 180/268
See application file for complete search history.

(56) References Cited

U.S. PATENT DOCUMENTS

| | | | |
|---|---|---|---|
| 5,552,986 A | 9/1996 | Omura et al. | |
| 5,558,370 A * | 9/1996 | Behr | 280/806 |
| 6,729,650 B2 * | 5/2004 | Midorikawa et al. | 280/807 |
| 6,908,112 B2 * | 6/2005 | Yano et al. | 280/805 |
| 7,128,343 B2 * | 10/2006 | Ingemarsson | 280/805 |
| 7,140,641 B2 * | 11/2006 | Ingemarsson et al. | 280/805 |
| 7,341,216 B2 * | 3/2008 | Heckmayr | 242/374 |
| 7,475,840 B2 * | 1/2009 | Heckmayr | 242/374 |
| 7,481,460 B2 * | 1/2009 | Odate | 280/806 |
| 7,624,833 B2 * | 12/2009 | Gillet | 180/268 |
| 7,654,573 B2 * | 2/2010 | Kudo et al. | 280/806 |
| 7,664,585 B2 * | 2/2010 | Odate | 701/45 |
| 7,686,118 B2 * | 3/2010 | Akaba et al. | 180/268 |
| 2003/0111287 A1 | 6/2003 | Enomoto | |
| 2004/0251367 A1 | 12/2004 | Suzuki et al. | |

FOREIGN PATENT DOCUMENTS

| | | |
|---|---|---|
| DE | 44 11 184 A1 | 10/1994 |
| DE | 203 19 071 U1 | 6/2004 |
| JP | 2004-17765 A | 1/2004 |
| JP | 2004-230976 A | 8/2004 |
| JP | 2004-322691 A | 11/2004 |

OTHER PUBLICATIONS

International Search Report dated May 19, 2005 including an English translation of the pertinent portions with Forms PCT/ISA/220 and PCT/ISA/237 dated Jan. 2004 (Eleven (11) pages).

* cited by examiner

Primary Examiner — Toan To
(74) Attorney, Agent, or Firm — Crowell & Moring LLP

(57) ABSTRACT

In a restraining device for an occupant of a vehicle, having a belt that can be drawn out or retracted by a lockable retractor, and a reversible seat-belt tightener, in the case of an impending but still avoidable first event the reversible seat-belt tightener automatically exerts and maintains a first tightening force on the belt and/or reduces the first tightening force if the first event is no longer impending. In the case of an impending, no longer avoidable second event, automatically exerts a second tightening force on the belt which is greater than the first tightening force. The first tightening force and the second tightening force acting constantly in the retracting direction.

15 Claims, 3 Drawing Sheets state of the art $$\vec{F}_{ges} = \vec{F}_a + \vec{F}_b$$

$$\vec{F}_s = \vec{F}_a = \vec{F}_b$$

RESTRAINING DEVICE FOR AN OCCUPANT OF A VEHICLE

This application is a national stage of PCT International Application No. PCT/EP2004/014680, filed Dec. 23, 2004, the disclosure of which is expressly incorporated by reference herein.

BACKGROUND AND SUMMARY OF THE INVENTION

The present invention relates to a restraining device for an occupant of a vehicle.

German patent document DE 44 11 184 C2 discloses a passenger restraint belt system for use with a seat fitted in a vehicle. It comprises a seat belt for securing a passenger in a seated position on the seat, a seat-belt tightener, which reacts to a control signal in order to restrain the passenger on the seat. A device is provided for measuring the distance and speed of the vehicle in relation to an object and a device for calculating a time after which a vehicle collision with the object is anticipated. A control unit generates a control signal, which increases the force of the seat-belt tightener in good time, if a vehicle collision is anticipated, and a second control signal, which reduces the force of the seat-belt tightener if no vehicle collision is anticipated.

The controllable seat-belt tightener is embodied as a pre-loader, which prior to the vehicle collision is effective only up to a predetermined pretightening force, and a further seat-belt tightener is provided, which is triggered if a vehicle collision is detected. The belt is tightened by retracting the belt latch mechanism with a total force. (FIG. 1 shows this process.) In so doing the belt latch mechanism divides the belt into two parts, in which the tightening component forces act in opposition to one another relative to the belt and are in each case less than the total force. As a result, only a slight, barely perceptible pressure is exerted on the upper body of the passenger.

Although in the case of danger, this passenger restraint belt system reduces any slack in the passenger seat belt, it does not act to provide the passenger with any indication.

One object of the invention, therefore, is to provide a simple and improved restraining device, which reduces any seat-belt slack of a vehicle occupant.

This and other objects and advantages are achieved by the restraining device according to the invention, which has a belt that can be drawn out or retracted by a lockable retractor, and a reversible seat-belt tightener. In the case of an impending but still avoidable first event, the reversible seat-belt tightener automatically exerts and maintains a first tightening force on the belt and/or reduces the first tightening force if the first event is no longer impending. In the case of an impending, no longer avoidable second event, it automatically exerets a second tightening force on the belt which is greater than the first tightening force. The first tightening force and the second tightening force act constantly in the retracting direction.

This restraining device reduces any slack in the seat belt of the vehicle occupant, and also indicates the risk of an impending but still avoidable first event to the vehicle occupant in the form of a tactile warning. The tightening in one direction relative to the belt means that the magnitude of the tightening force is identical in all areas of the belt and is clearly perceptible by the occupant.

Should one of the events occur, the occupant is optimally protected against any acceleration in that, in the case of a third event being detected, the seat-belt tightener automatically exerts a third tightening force on the belt, which is greater than the second tightening force. The third tightening force preferably acts exclusively in the retracting direction. In the case of the third force also, an identical force thereby acts in all areas of the belt. The third force is preferably exerted by the triggering of an explosive charge.

In other words, the first, second and third events represent the severity of the risk of an impending accident. As the risk of an accident increases, the force to be exerted on the belt is steadily increased in the form of the associated first and second tightening forces, and is explosively increased in the form of the third tightening force when an accident is identified.

In one possible embodiment, in the case of an impending but avoidable first event, the seat-belt tightener exerts a fourth tightening force, the magnitude of which lies between the first and second forces, after a first delay interval which commences after exertion of the first tightening force and prior to exertion of the second tightening force. A fourth event is associated with the fourth tightening force. It is defined as a point in time prior to the second event and after the delay interval following the exertion of the first force has elapsed.

In another embodiment, in the case of a first event, the seat-belt tightener exerts a fourth tightening force, which is followed immediately by a delay interval prior to exertion of the second tightening force and the magnitude of which lies between the first force and the second force.

Both of these variants of the intermittent tightening make the indication given to the occupant even more perceptible. If there is sufficient time before the advent of the second event, the exertion of the fourth tightening force is repeated with an increased fourth tightening force after a further delay interval.

In this case the fourth tightening force acts exclusively in the retracting direction. In the case of the fourth force also, an identical force thereby acts in all areas of the belt.

In a preferred embodiment the seat-belt tightener is arranged in the area of the retractor, which facilitates tightening in the retracting direction. This is particularly feasible, with little outlay, if the seat-belt tightener uses the tightening forces to displace the retractor.

In an advantageous embodiment the retractor is automatically locked prior to the exertion of a tightening force, and the locking of the retractor is automatically canceled prior to the reduction of this tightening force. In this way the requisite tightening distances are minimized. In addition, the tightening is canceled as soon as the risk of the relevant or ensuing event has passed. The occupant is thereby able to move more freely.

In another possible variant, the seat-belt tightener uses the tightening forces to retract the belt into the retractor. The rotating movement means that this variant takes up less space than a displacing movement. The belt is suitably embodied as a three-point belt, thereby providing a simple and highly reliable means of restraint.

In an advantageous embodiment at least one radar distance-measuring device is used to detect an impending event. This permits a precise and rapid calculation of the distances and relative speeds and thereby gives the restraining device a short reaction time.

In a preferred embodiment the restraining device is arranged on a driver's seat in the vehicle. Given an impending event, the driver is consequently prompted to react accordingly, for example to brake or brake more sharply, or to undertake an evasive maneuver.

Other objects, advantages and novel features of the present invention will become apparent from the following detailed description of the invention when considered in conjunction with the accompanying drawings.

DETAILED DESCRIPTION OF THE DRAWINGS

Figure 1:
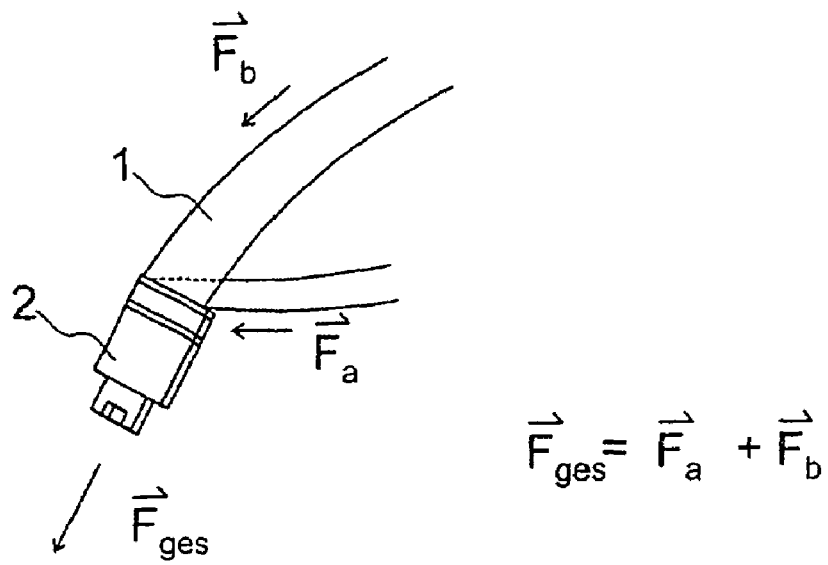
FIG. 1 shows the belt tightening principle according to the state of the art.

Corresponding parts are provided with the same reference numerals in all figures.

FIG. 1 is a schematic representation of the tightening of the belt 1 by retraction of the belt latch mechanism 2 according to the prior art. The total force $F_{ges}$ is made up of two component forces $F_a$ and $F_b$, which are both less than the total force $F_{ges}$.

Figure 2:
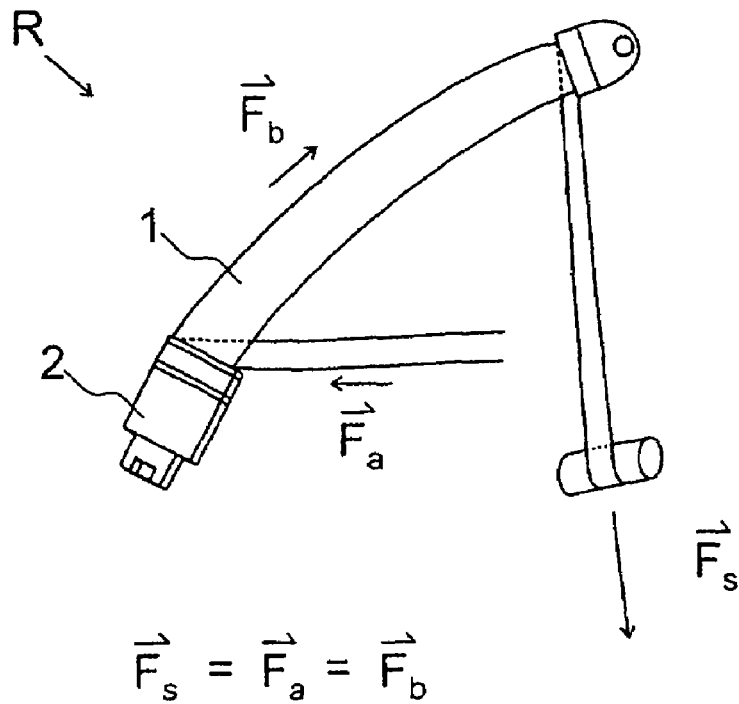
FIG. 2 shows the belt tightening principle according to the invention.

FIG. 2 shows the principle for tightening a belt 1 of a restraining device R according to the invention. The tensioning or tightening force $F_S$ here acts along the belt 1 in the retracting direction. In the instance depicted, the belt 1 is reeled up for tightening retraction. The tightening force $F_S$ is of equal magnitude everywhere along the belt 1. The belt latch mechanism 2 can be additionally retracted in order to achieve greater tightening. In this case different forces again act along the belt 1.

Figure 3:
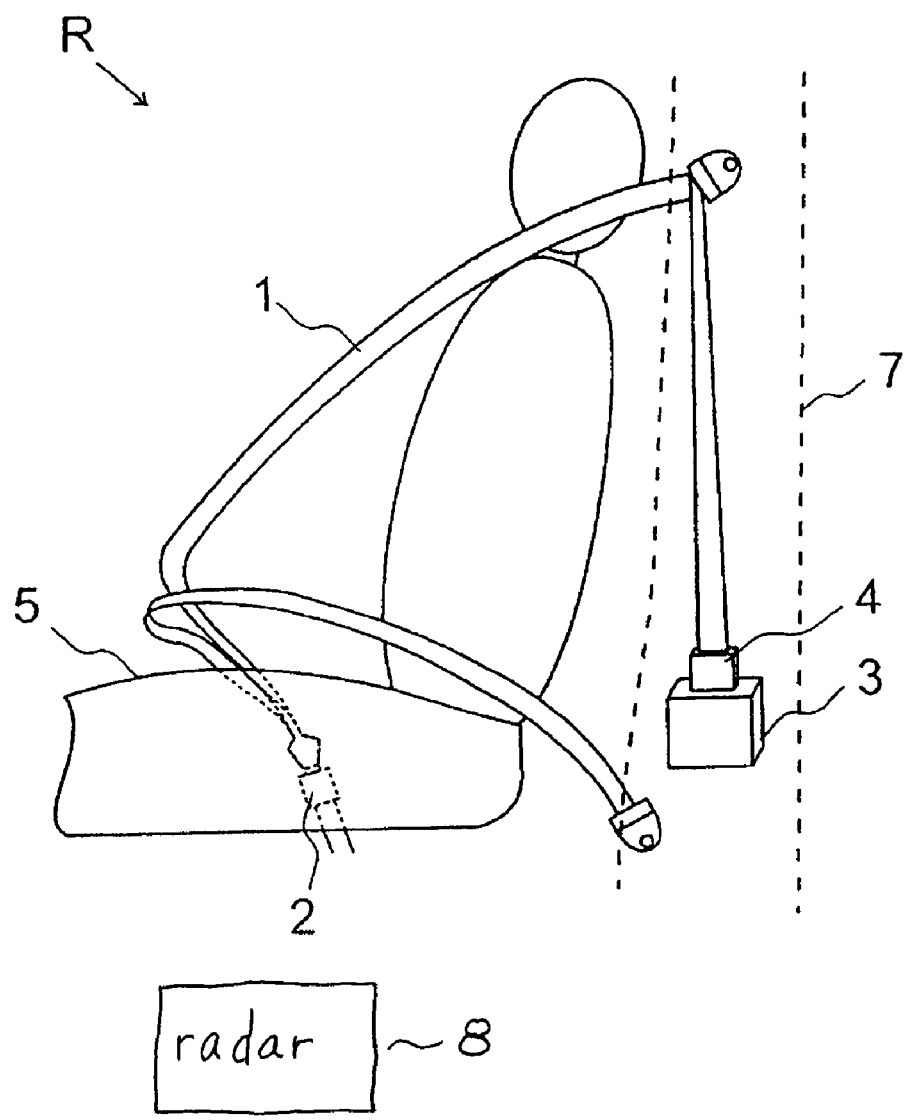
FIG. 3 is a side view of a restraining device.

FIG. 3 represents a restraining device R of a vehicle (not shown). It has a belt 1 embodied as a three-point belt, a belt latch mechanism 2 and a retractor 3. The belt 1 can be partially retracted into the retractor 3 by winding it onto a reel (not shown). Correspondingly, the belt 1 can be partially drawn out of the retractor 3, by winding it off from the reel (not shown). A reversible seat-belt tightener 4 is incorporated into the retractor 3. The restraining device R is arranged on a driver's seat 5. The retractor 3 and one end of the belt 1 are fixed to a B-pillar 7 of the vehicle. The belt latch mechanism 2 is fixed to the driver's seat 5.

As a radar device, the vehicle furthermore has a Doppler radar sensor 8, for example, for measuring the relative speed and distance to a vehicle traveling in front or an obstacle. A processor unit arranged inside the seat-belt tightener 4 uses measured data from the distance and relative speed measurements, which are extrapolated into the future, to determine the probable time of an anticipated event E1 to E4. (See FIGS. 4 and 5.) In this case such an event E1 to E4 is an impact with a vehicle traveling in front or an object. In other instances an event E1 to E4 may also be a loss of wheel adhesion when cornering, additional measured data being required such as the absolute speed.

Should the extrapolated measured data show that the occurrence of one of the events E1 to E4 is impending, and the relevant event E1 to E4, especially the first event E1, can still be averted by corresponding reactions on the part of the driver, the seat-belt tightener 4 automatically exerts and maintains a first tightening force FS1 as tensioning force FS on the belt 1 in its retracting direction until such time as the first event E1 is no longer impending. The attention of the driver is drawn to the hazardous situation by this admonitory tightening, in particular the pressure of the belt 1 on his shoulder. If it is detected that the first event E1 can no longer occur, the first tightening force FS1 is no longer maintained, and the belt 1 can relax into its previous position again.

As time progresses, the seat-belt tightener 4 at intervals $T_1$ exerts fourth forces $F_{S4}$ on the belt 1 along its retracting direction; the tension of the belt 1 between the intervals $T_1$ is kept constant for a delay interval $T_2$. This intermittent tightening indicates to the driver that there is an increasing risk. If the trend progresses to the extent that the occurrence of the still avoidable first event E1 can no longer be averted by braking, and is consequently turning into the unavoidable second event E2, the seat-belt tightener 4 automatically generates a second tightening force $F_{S2}$ on the belt 1 in its retracting direction, which is greater than the first tightening force $F_{S1}$. This second tightening force $F_{S2}$ secures the driver to the driver's seat 5, thereby preparing him for an impact with minimal risk of injury.

The first, second and fourth tightening forces $F_{S1}$, $F_{S2}$ and $F_{S4}$ are generated by the seat-belt tightener 4, by displacing the retractor 3 vertically downwards by a corresponding distance, once the retraction/pay-out mechanism of the retractor 3 has been automatically locked. If the first event E1 or one of the other events could be avoided, the locking is canceled and the displacement of the retractor 3 is reversed, in order to allow the belt 1 to relax. The seat-belt tightener 4 is therefore described as reversible.

At the occurrence of the third event E3, the seat-belt tightener, by detonating an explosive charge (not shown), automatically generates a third, drastically tightening force $F_{S3}$ on the belt 1 in its retracting direction, which is significantly greater than the second tightening force $F_{S2}$ and is attained very much more rapidly. This tightening reduces any possible acceleration of the driver's body relative to the vehicle and consequently reduces the risk of injury on impact, particularly in combination with an airbag. By pre-tightening up to and including the second tightening force $F_{S2}$, a decisive time advantage is gained. The maximum force level is attained in good time, thereby minimizing the ride-down effect.

Figure 4:
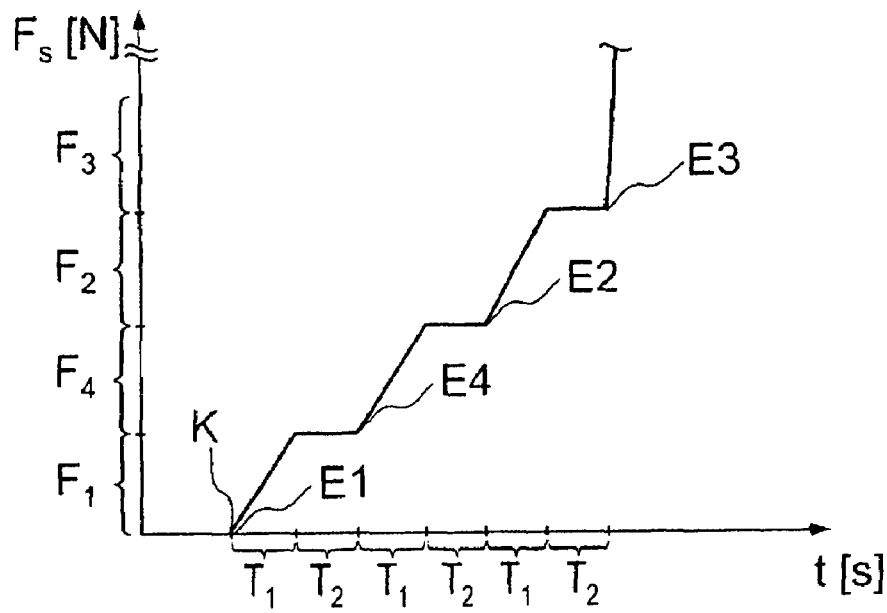
FIG. 4 shows the time curve for the forces acting on the belt.

FIG. 4 represents the magnitude of the tightening force $F_S$ acting on the belt 1 at any given time in the exemplary embodiment according to FIG. 3 as a function of the time t. The criticality of the situation is detected at time K. The belt 1 is steadily tightened at the intervals $T_1$. Between the intervals $T_1$ the tensioning force $F_S$ is constant during the delay intervals $T_2$.

Figure 5:
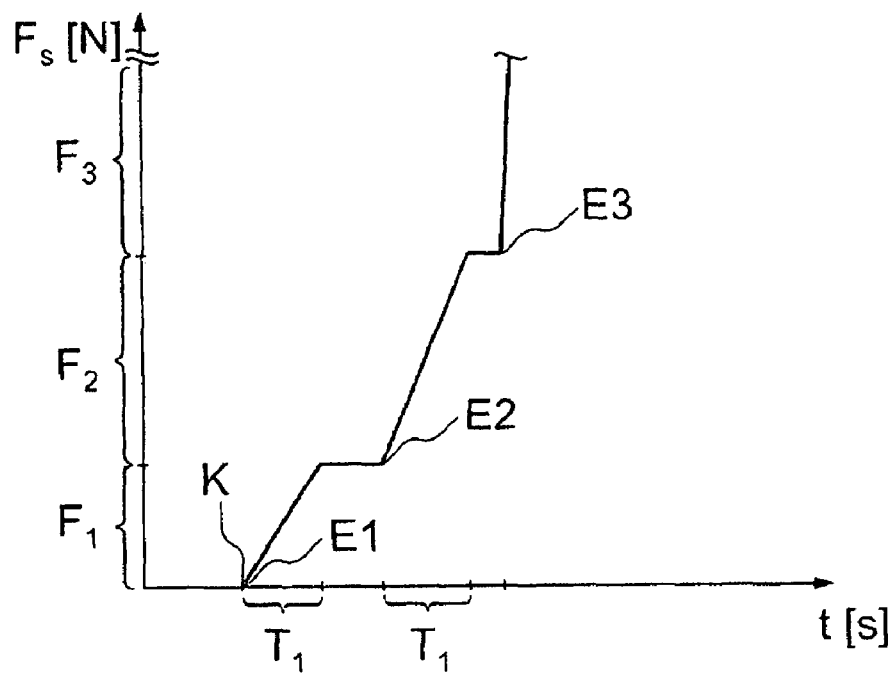
FIG. 5 shows the time curve for the forces acting on the belt in another embodiment.

FIG. 5 shows a variation of the exemplary embodiment in FIGS. 3 and 4, in which no fourth tightening force $F_{S4}$ is exerted, because the time to the occurrence of the event E is not sufficient for further intermediate stages, for example. The delay intervals $T_2$, moreover, become shorter in the course of the admonitory tightening and the increases in the force are more drastically pronounced, in order to bring the impending event E more perceptibly to the attention of the driver.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

R restraining device
E event
1 belt
2 belt latch mechanism
3 retractor
4 seat-belt tightener
5 driver's seat
$F_a$, $F_b$ component force $F_{ges}$ total force
$F_S$ tensioning force
$F_{S1}$ first tightening force
$F_{S2}$ second tightening force
$F_{S3}$ third tightening force
$F_{s4}$ fourth tightening force
$T_1$ interval
$T_2$ delay interval
t time

The invention claimed is:

1. A restraining device for an occupant of a vehicle, comprising:
   a lockable retractor;
   a belt which can be drawn out or retracted by the lockable retractor; and
   a reversible seat-belt tightener; wherein:
   in the case of an impending but still avoidable first event the reversible seat-belt tightener automatically exerts and maintains a first tightening force on the belt and reduces the first tightening force if the first event is no longer impending;
   in the case of an impending, no longer avoidable second event the reversible seat-belt tightener automatically exerts a second tightening force on the belt which is greater than the first tightening force; and
   the first tightening force and the second tightening force act constantly in a retracting direction of the seat belt.

2. The restraining device as claimed in claim 1, wherein, when a third event is detected, the seat-belt tightener automatically exerts a third tightening force on the belt, which third tightening force is greater than the second tightening force.

3. The restraining device as claimed in claim 2, wherein the third tightening force acts constantly in the retracting direction.

4. The restraining device as claimed claim 3, wherein the third force is exerted by the triggering of an explosive charge.

5. The restraining device as claimed in claim 1, wherein the seat-belt tightener is arranged in proximity to the retractor.

6. The restraining device as claimed in claim 1, wherein the seat-belt tightener displaces the retractor by means of at least one of the tightening forces.

7. The restraining device as claimed in claim 1, wherein the seat-belt tightener retracts the belt by means of at least one of the tightening forces.

8. The restraining device as claimed in claim 1, wherein the belt is a three-point belt.

9. The restraining device as claimed in claim 1, wherein the second event is a vehicle collision.

10. The restraining device as claimed in claim 1, wherein at least one radar distance-measuring device is provided for detecting the impending occurrence of at least one or more of the events.

11. The restraining device as claimed in claim 1, wherein the restraining device is arranged on a driver's seat of the vehicle.

12. A restraining device for an occupant of a vehicle, comprising:
    a lockable retractor;
    a belt which can be drawn out or retracted by the lockable retractor; and
    a reversible seat-belt tightener; wherein:
    in the case of an impending but still avoidable first event the reversible seat-belt tightener automatically exerts and maintains a first tightening force on the belt and reduces the first tightening force if the first event is no longer impending;
    in the case of an impending, no longer avoidable second event the reversible seat-belt tightener automatically exerts a second tightening force on the belt which is greater than the first tightening force;
    the first tightening force and the second tightening force act constantly in a retracting direction of the seat belt;
    in the case of the first event, the seat-belt tightener exerts a fourth tightening force;
    the fourth tightening force has a magnitude of which lies between the first force and the second force; and
    the fourth tightening force is exerted after a first delay interval following exertion of the first tightening force, and prior to exertion of the second tightening force.

13. The restraining device as claimed in claim 12, wherein the fourth tightening force acts exclusively in the retracting direction.

14. The restraining device as claimed in claim 13, wherein:
    the retractor is automatically locked prior to the exertion of at least one of the tightening forces; and
    the locking of the retractor is automatically canceled prior to the reduction of the relevant tightening force.

15. A restraining device for an occupant of a vehicle, comprising:
    a lockable retractor;
    a belt which can be drawn out or retracted by the lockable retractor; and
    a reversible seat-belt tightener; wherein:
    in the case of an impending but still avoidable first event the reversible seat-belt tightener automatically exerts and maintains a first tightening force on the belt and reduces the first tightening force if the first event is no longer impending;
    in the case of an impending, no longer avoidable second event the reversible seat-belt tightener automatically exerts a second tightening force on the belt which is greater than the first tightening force;
    the first tightening force and the second tightening force act constantly in a retracting direction of the seat belt; and
    in the case of the first event, the seat-belt tightener exerts a fourth tightening force, which is followed immediately by a delay interval prior to exertion of the second tightening force, and the magnitude of which lies between the first force and the second force.

* * * * *